United States Patent
Ma et al.

[19]

[11] Patent Number: 6,076,569
[45] Date of Patent: Jun. 20, 2000

[54] CUP RINSE WITH A VALVULAR RING

[75] Inventors: Hung-Lung Ma, Miao-Li Hsien; Hsien-Jung Hsu, Kaohsiung; Kuo-Chen Wang; Kuei-Hsi Lai, both of Hsinchu Hsien, all of Taiwan

[73] Assignee: United Microelectronics Corp., Hsinchu, Taiwan

[21] Appl. No.: 09/193,513

[22] Filed: Nov. 17, 1998

[51] Int. Cl.[7] .................................................. B65B 1/04
[52] U.S. Cl. ..................... 141/350; 141/301; 251/149.1
[58] Field of Search ................................... 141/301, 349, 141/350, 351; 251/149.1–149.3

[56] References Cited

U.S. PATENT DOCUMENTS

| | | | |
|---|---|---|---|
| 3,941,270 | 3/1976 | Spielman | 141/350 |
| 5,167,637 | 12/1992 | Okada et al. | 251/149.1 |
| 5,269,763 | 12/1993 | Boehmer et al. | 604/167 |

*Primary Examiner*—Steven O. Douglas
*Attorney, Agent, or Firm*—J.C. Patents; Jiawei Huang

[57] ABSTRACT

A cup rinse with a valvular ring according to the invention is disclosed. The valvular ring has a plurality of valves in the center thereof. When an inlet tube is inserted through the valvular ring, the valves are forced to open thereby to allow a chemical liquid to flow into the cup resin via the inlet tube. Inversely when the inlet tube is completely pulled out of the valvular ring, the valves are tightly closed without a chemical liquid leakage. Accordingly, the cup rinse of the invention can prevent peripheral precision instruments, such as a motor, from damage by a leaky chemical liquid. Thus, the cup rinse of the invention cannot cause any unnecessary cost consumption.

7 Claims, 5 Drawing Sheets

CUP RINSE WITH A VALVULAR RING

BACKGROUND OF THE INVENTION

1. Field of the Invention

The invention relates to a valvular ring, a nd in particular to a valvular ring designated on a cup rinse for preventing a chemical liquid leakage from causing peripheral instruments damages.

2. Description of the Related Art

It is well known that photolithography is one of the most important steps in the semiconductor process. Any regions related to the structure of semiconductor devices, such as subsequently pattered and doped regions, are all defined by photolithography. Thus, the complexity of the semiconductor process depends on the times of photolithography performed and the numbers of mask used.

Although the photolithography is complicated, the principle thereof is quite simple. To perform the photolithography, a photo-sensitive material is first formed on a wafer. A parallel light coming from a light source passes through a glass-based mask and irradiates the photo-sensitive material. At the same time, a pattern on the mask is projected onto the photo-sensitive material. A selective photo-sensitive reaction is performed to accomplish a pattern transfer. In general, the photo-sensitive material is called a photoresist.

Currently, a non-defect photoresist with a better uniformity and a higher adhesion is formed on a wafer by spin coating. Referring to FIG. 1, there is shown a spinner used for spin coating. An appropriate vacuum is provided inside the axis of a spinner 10 to suck a wafer 12 thereon. When the spinner 10 rotates the wafer 12, a photoresist liquid 14 is sprinkled on the rotated wafer 12 and then removed towards the circumference thereof owing to a centrifugal force, thereby forming an uniform photoresist layer 16.

Next, Referring to FIG. 2, the relationship between the spinner of FIG. 1 and a cup rinse is shown. In FIG. 2, the spinner shown with dotted lines rotates with a high speed. A fixed container 20 is used to prevent sprinkling part of a photoresist liquid 21 onto the ground. However, after a long-term operation, the interior surface of the fixed container 20 is almost covered by part of the photoresist liquid 21. To remove the stuck photoresist liquid 21 covering the interior surface of the fixed container 20, a cup rinse 22 is installed under the spinner. Furthermore, an inlet tube 24 is inserted through a ring 32 on the bottom of the cup rinse 22 to allow a chemical liquid, such as an OK-82 solution, to flow into the cup rinse 22. Then, the chemical liquid is sprayed to the fixed container 20 thereby to clean the stuck photoresist liquid. At the same time, the sprayed and used chemical liquid flows into a base 26 along the wall of the fixed container 20. Subsequently, the chemical liquid collected in the base 26 is discharged out via an outlet tube 28. A precision motor (not shown) is located in a region 30 surrounded by the base 26.

FIGS. 3A–3C are a side view, a top view and a cross-sectional view of the ring 32 shown in FIG. 2. It can be obviously seen from FIGS. 3A–3B that the center of the ring 32 is hollow. Therefore, the chemical liquid can easily flow onto the ground when the cup rinse 22 is dismounted.

FIG. 4 shows that a chemical liquid flows out onto the ground when the dismounted cup rinse is removed. During maintenance, the cup rinse 22 must be first dismounted. At this time, the chemical liquid can flow out through the hollow ring 32, even though the inlet tub 24 is pulled out of the ring 32. To prevent the above-stated problem, the chemical liquid must completely flow to the base 26 and then discharged out via the outlet tube 28 before dismounting the cup rinse 22. However, part of the chemical liquid can be sprinkled on the motor (not shown) located in the center region 30. This causes a serious damage on the motor, since the chemical liquid used for removing a stuck photoresist liquid has a strong corrosion. For example, if part of the chemical liquid is sprinkled on the axis of the motor, it causes the motor totally broken down.

SUMMARY OF THE INVENTION

In view of the above, an object of the invention is to provide a cup rinse with a valvular ring designed instead of the hollow ring of the prior art, wherein the valvular ring has a plurality of valves in the center thereof. When the cup rinse of the invention is dismounted, the valves are tightly closed, thereby preventing a precision motor from damage by a chemical liquid leakage. Thus, it cannot cause any unnecessary cost consumption.

According to the invention, the cup rinse with a valvular ring through which an inlet tube can be inserted to provide a chemical liquid, is characterized in that the valvular ring has a plurality of valves in the center thereof. When the inlet tube is inserted through the valvular ring, the valves are completed open. Inversely, when the inlet tube is pulled out of the valvular ring, the valves are automatically and tightly closed. Accordingly, the cup rinse with a valvular ring can efficiently prevent a chemical liquid leakage.

BRIE DESCRIPTION OF THE DRAWINGS

The invention will he more fully understood from the detailed description given hereinbelow and the accompanying drawings, which are given by way of illustration only, and thus do not limit the present invention, and wherein.

DETAILED DESCRIPTION OF THE EMBODIMENTS

Figure 1:
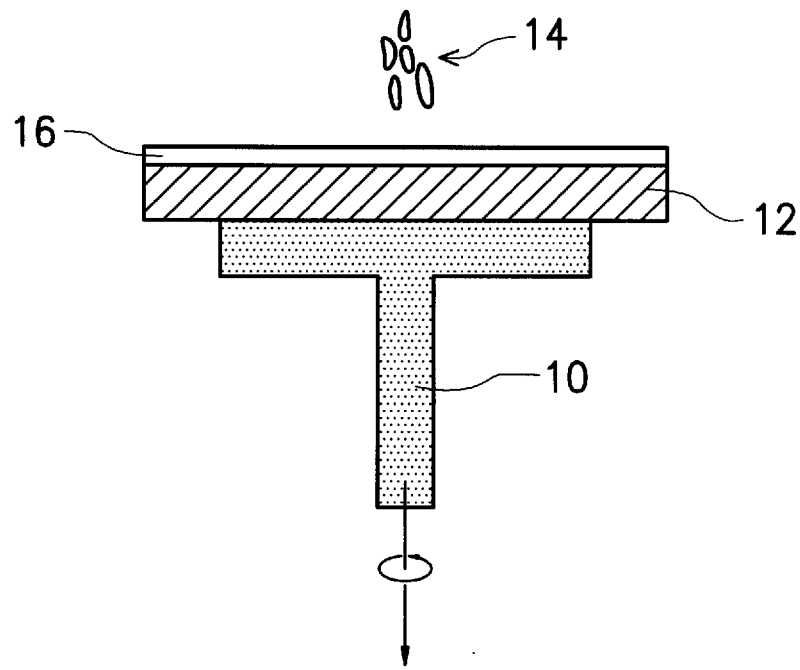
FIG. 1 is a side view showing a spinner used for spin coating.
Figure 2:
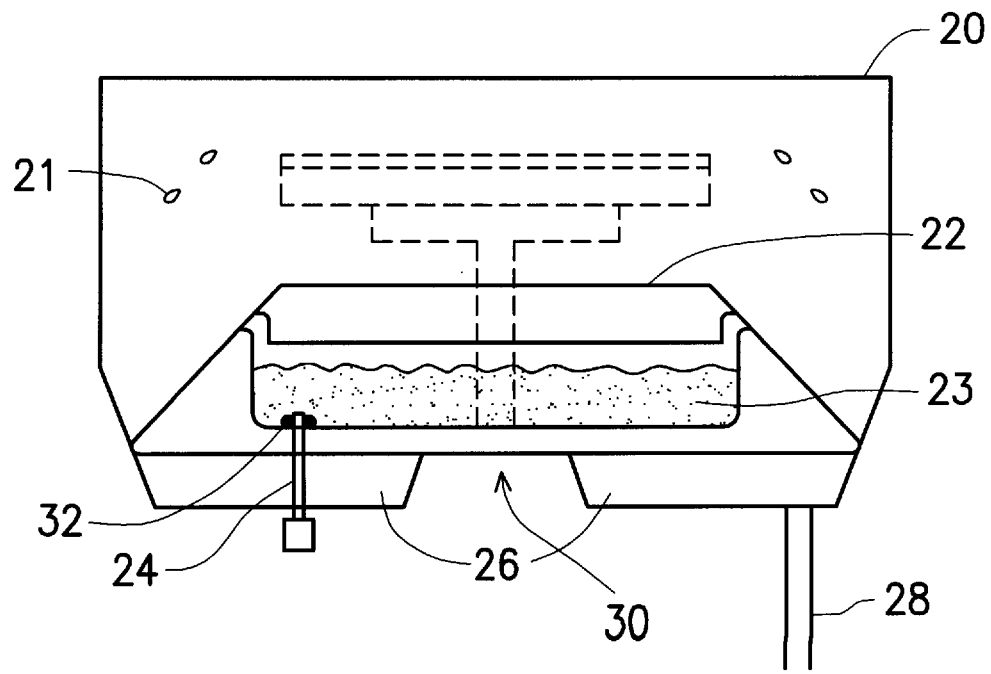
FIG. 2 is a schematic view showing the relationship between the spinner of FIG. 1 and a cup rinse.
Figure 3A:
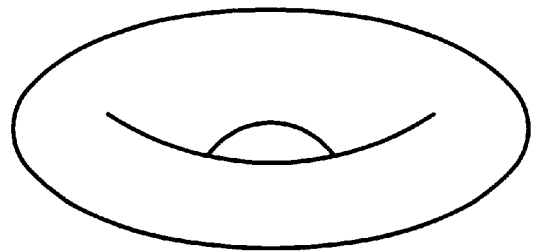
FIGS. 3A–3C are a side view a top view and a cross-sectional view of FIG. 2.
Figure 3B:
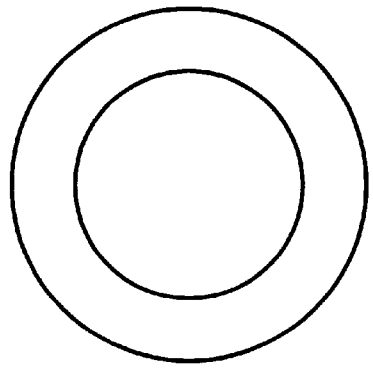
Figure 3C:
Figure 4:
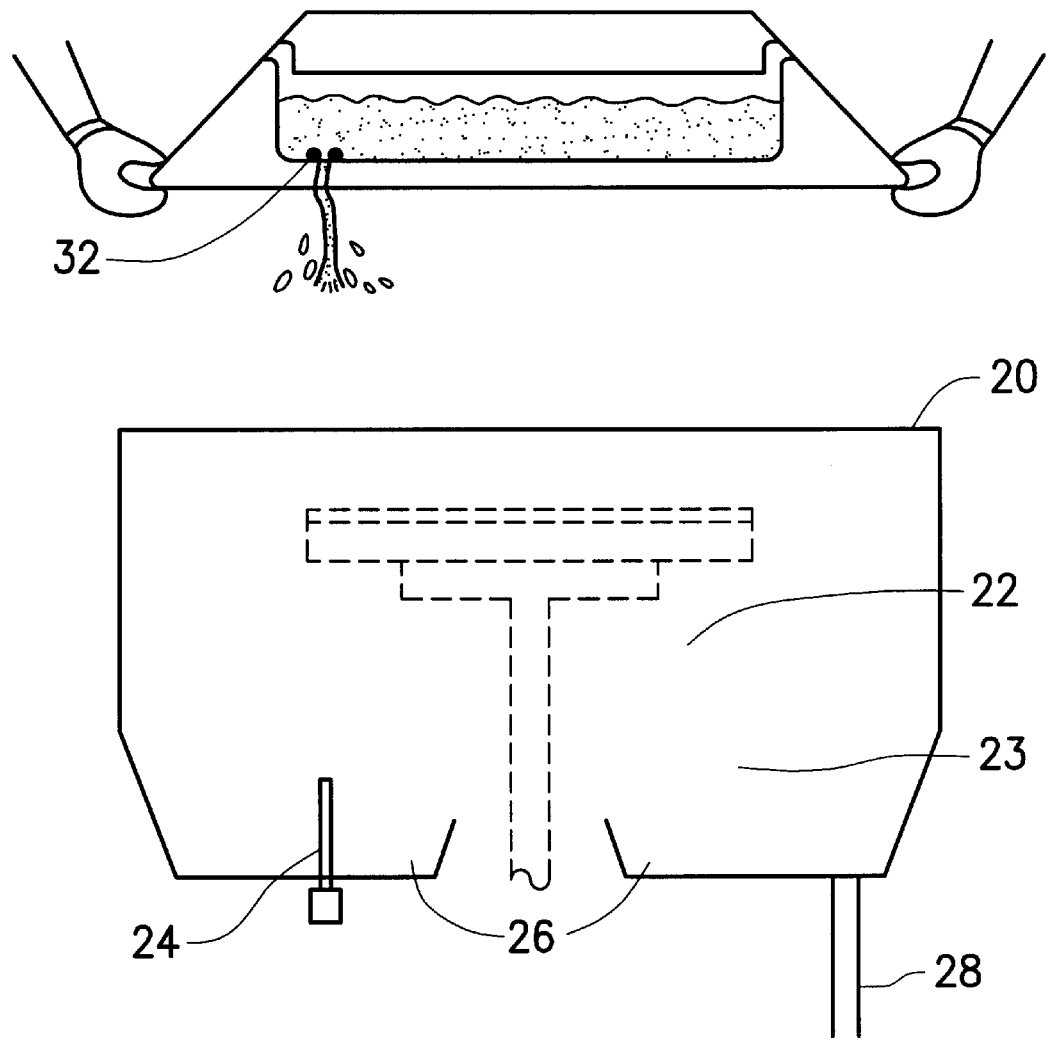
FIG. 4 is a schematic view showing that a chemical liquid is sprinkled onto the ground when a cup rinse is removed.
Figure 5A:
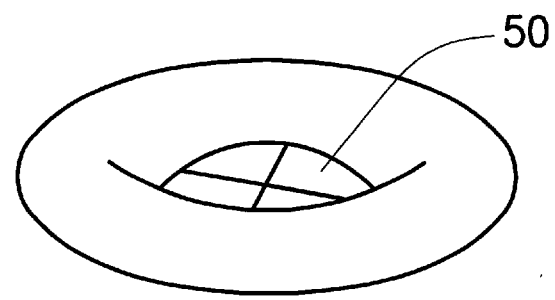
FIGS. 5A–5C are a side view, a top view and a cross-sectional view of a valvular ring of a cup rinse according to the invention.
Figure 5B:
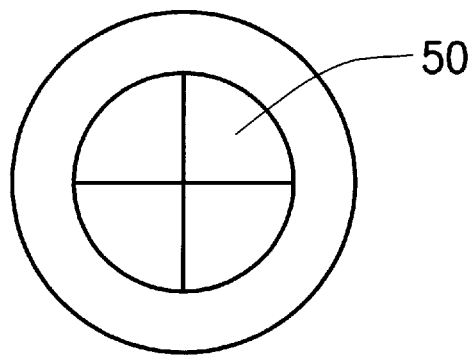
Figure 5C:
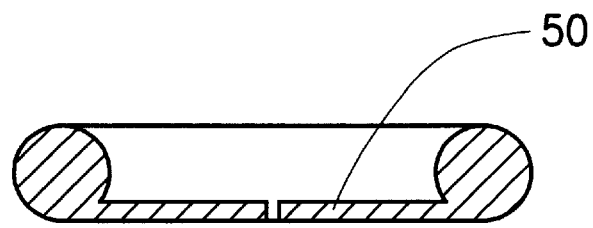

Referring to FIGS. 5A–5C there are shown a side view, a top view and a cross-sectional view of a valvular ring of a cup rinse according to the invention. The main difference to the prior art is that the center of the valvular ring is designed with a plurality of valves 50 such as 4 valves.

Figure 6A:
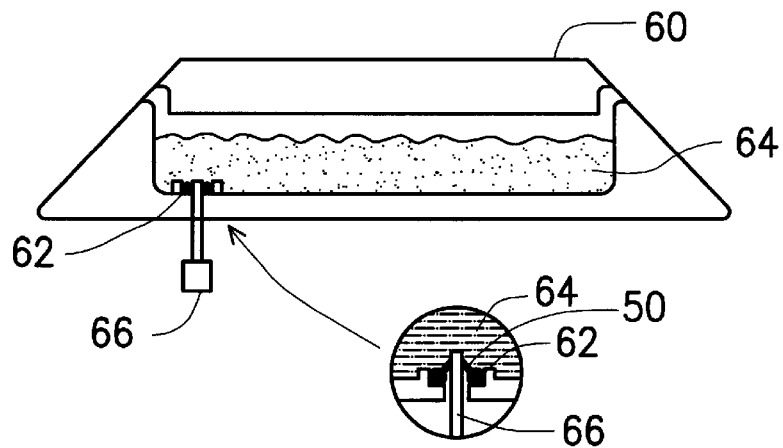
FIGS. 6A–6C are schematic views showing an internal chemical liquid is not sprinkled onto the ground when a cup rinse with a valvular ring is dismounted and removed.
Figure 6B:
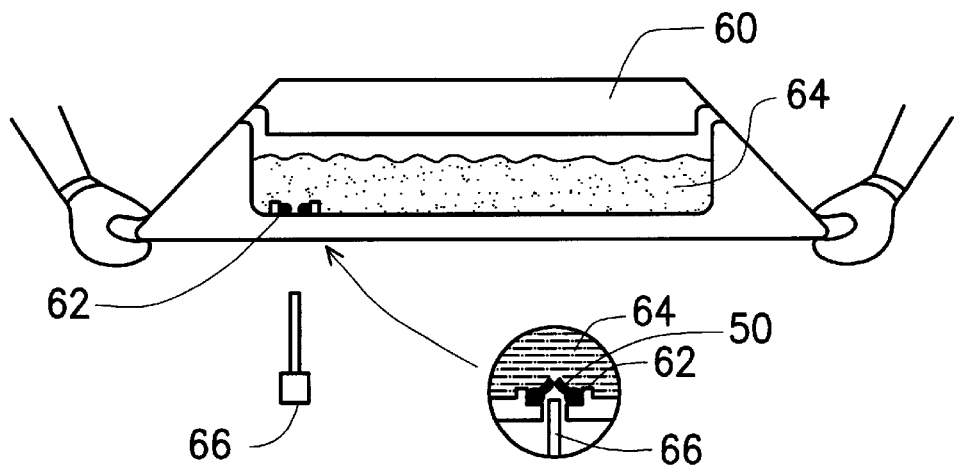
Figure 6C:
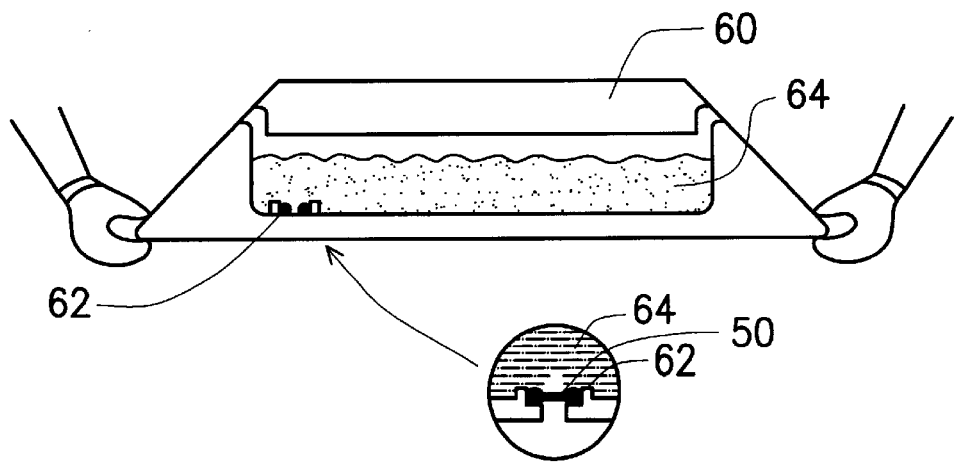

FIGS. 6A–6C are schematic views showing that an internal chemical liquid is not sprinkled onto the ground when a cup rinse with a valvular ring is dismounted and removed according to the invention.

First, referring to FIG. 6A, a cup rinse 60 has a valvular ring 62 on the bottom thereof. An inlet 66 is inserted through the valvular ring 62 thereby to supply a chemical liquid 64, for example, used to remove a stuck photoresist liquid to the inside of the cup rinse 60. As shown in a magnified view of FIG. 6A the inlet tube 66 is tightly inserted through the valvular ring 62. At this time the valves 50 of the valvular ring, is open upward, but still tightly encloses the inlet tube 66. Thus, the chemical liquid can be allowed to flow into the cup rinse 60 via the inlet tube 66 without a chemical liquid leakage.

Referring to FIG. 6B the inlet tube 66 is completely pulled away from the valvular ring 62. As shown in a magnified view of FIG. 6B, a force is created to pull the open valves 50 back to original positions in line with pulling the inlet tube 66 out of the valvular ring 62.

As shown in a magnified view of FIG. 6C, the valves 50 are tightly closed without a chemical liquid leakage as stated in the prior art.

Accordingly, the cup rinse with a valvular ring of the invention can efficiently prevent a chemical liquid leakage from causing a damage on the precision motor because the valves located in the center of the valvular ring is tightly closed when the inlet tube is completely pulled out of the cup rinse.

While the invention has been described by way of example and in terms of the preferred embodiment, it is to be understood that the invention is not limited to the disclosed embodiment. To the contrary, it is intended to cover various modifications and similar arrangements as would be apparent to those skilled in th e art. Therefore, the scope of the appended claims should be accorded the broadest interpretation so as to encompass all such modifications and similar arrangements.

What is claimed is:

1. A cup rinse comprising a valvular ring, through which an inlet tube can be inserted to supply a chemical liquid, characterized in that:

the valvular ring has a plurality of valves in the center thereof, wherein the valves are forced to open inward thereby to allow the chemical liquid to flow into the cup rinse via the inlet tube when the inlet tube is inserted through the valvular ring, and inversely, the valves are tightly closed without a chemical liquid leakage when the inlet tube is pulled out of the valvular ring.

2. The cup rinse as recited in claim 1, wherein the number of the valves is 4.

3. The cup rinse as recited in claim 1, wherein the inlet tube, inserted through the valvular ring, is tightly enclosed by the opened valves without a chemical liquid leakage.

4. The cup rinse as recited in claim 1, wherein the valves are tightly closed without a chemical liquid leakage after the inlet tube is completely pulled out of the valvular ring.

5. The cup rinse as recited in claim 1, wherein the chemical liquid is used to remove an stuck photoresist liquid.

6. The cup rinse as recited in claim 1, wherein the valvular ring is located at the bottom of the cup rinse.

7. A cup rinse comprising:

a valvular ring, through which an inlet tube can be inserted to supply a chemical liquid; and a plurality of valves located in the center of the valvular ring, wherein when the inlet tube is inserted through the valvular ring, the valves arc forced upward to open so as to allow the chemical liquid to flow from the inlet tube into the cup rinse, and when the inlet tube is pulled out from the valvular ring, the valves are closed to prevent the chemical liquid leakage from the cup rinse.

* * * * *